April 9, 1935.  C. C. STEVENS  1,996,842
GRINDING MACHINE
Filed May 26, 1932  8 Sheets-Sheet 1

FIG. 1

INVENTOR:
CLARENCE C. STEVENS,
BY
HIS ATTORNEY.

April 9, 1935.  C. C. STEVENS  1,996,842
GRINDING MACHINE
Filed May 26, 1932  8 Sheets-Sheet 2

INVENTOR:
CLARENCE C. STEVENS,
BY
HIS ATTORNEY.

April 9, 1935.   C. C. STEVENS   1,996,842
GRINDING MACHINE
Filed May 26, 1932   8 Sheets-Sheet 3

INVENTOR:
CLARENCE C. STEVENS,
BY
HIS ATTORNEY.

April 9, 1935.  C. C. STEVENS  1,996,842
GRINDING MACHINE
Filed May 26, 1932   8 Sheets-Sheet 4

INVENTOR:
CLARENCE C. STEVENS,
BY
HIS ATTORNEY.

April 9, 1935. C. C. STEVENS 1,996,842
GRINDING MACHINE
Filed May 26, 1932 8 Sheets-Sheet 5

INVENTOR:
CLARENCE C. STEVENS,
BY
HIS ATTORNEY.

April 9, 1935.　　　C. C. STEVENS　　　1,996,842
GRINDING MACHINE
Filed May 26, 1932　　　8 Sheets-Sheet 7

INVENTOR:
CLARENCE C. STEVENS,
BY
HIS ATTORNEY.

FIG. 20

INVENTOR:—
CLARENCE C. STEVENS,
BY
HIS ATTORNEY

Patented Apr. 9, 1935

1,996,842

UNITED STATES PATENT OFFICE 1,996,842

GRINDING MACHINE

Clarence C. Stevens, Forestville, Conn., assignor, by mesne assignments, to General Motors Corporation, Detroit, Mich., a corporation of Delaware Application May 26, 1932, Serial No. 613,731

46 Claims. (Cl. 51—43)

This invention relates to grinding machines and comprises all of the features of novelty herein disclosed. An object of the invention is to provide an improved machine for grinding bores. Another object is to provide an improved bore grinding machine having a fixed work holder and a grinding wheel which moves in an orbit. Another object is to provide an improved cross feeding mechanism especially wherein a spindle movable in an orbit has that orbit gradually increased in diameter. Another object is to provide improved means for changing the rate of cross feed. Still another object is to provide improved gauging means for controlling the grinding operation. Another object is to provide improved means for dressing or truing a grinding wheel. Yet another object is to provide improved carriage control mechanism, as by utilizing induction mechanism to reverse the carriage instead of dogs operating a reversing lever.

To these ends and also to improve generally upon machines of this character, the invention consists in the various matters hereinafter described and claimed. In its broader aspects, the invention is not necessarily limited to the specific construction selected for illustrative purposes in the accompanying drawings in which

Outlining first the general functions, a workpiece W, such as a ring to be internally ground is clamped in a fixed position on a work head while a grinding wheel G is reciprocated axially through the bore. The grinding wheel is carried by a reciprocating table and rotates on its axis while also being carried bodily in an orbit provided by adjustable, eccentric bearings. The orbit of the wheel is gradually increased to provide a cross feed which thus makes the cutting point travel in a spiral path. A ratchet counting device operated by the table provides a predetermined number of table reciprocations which produce a coarse cross-feed of the wheel. This counting device initiates a fine feed movement of the wheel and also initiates the advance of an electric feeler gauge to operative position. The table is given an amplified stroke controlled by the counting device to withdraw the wheel for dressing or truing, the amplified stroke of the wheel causing advance of a diamond across the wheel. The gauge is operative only during the finishing strokes and completes a circuit which backs off the wheel crosswise and causes the table to retreat to a remote position. The table controls its own reciprocation by induction mechanism including transformers and grid glow tubes which energize solenoids controlling a reversing valve.

*Chuck and operating mechanism. See Figs. 1, 2, 3 and 4*

The machine has a main frame 10 carrying a work-head 12 at one end, the head comprising a supporting standard 14 and a cap piece 16 which rigidly support a sleeve 18. An enlarged head 20 on the sleeve is clamped against one end of the standard by a nut 22. The head 20 is threaded to receive a face plate 24 having an abutment face 26 to engage and position one end of a work-piece W. Curved clamping fingers 28, preferably three in number, are pivoted at 30 in longitudinal slots of the head and have their ends suitably shaped to conform to the exterior of the piece W. Coil springs 32 urge the fingers outwardly but the fingers are positively held inwardly to clamping position by rounded projections 34 confined by the inner surface of a hollow slide 36 which has a conical cam surface 38 at its outer end. Spring pressed plungers 40 in recesses of the face plate 24 engage a flange 42 on the slide to urge it to finger-releasing position but the slide is positively held outwardy by push rods 44 attached to a flange 46 on the head of a movable cylinder 48 which surrounds a fixed piston or collar 50 on the sleeve 18. Suitable packing glands 52 in the heads of the cylinder provide a tight sliding engagement of the latter with the sleeve 18. Flexible pipes 54 and 56 conduct pressure fluid to and from the movable cylinder. A hand control valve controls the cylinder for chucking as will appear.

A lower guard plate 60 is attached to the standard 14 to surround the work and the chuck and is provided with an outlet chute 62 for cooling medium. An upper movable guard 64 is attached to a bracket 66 having hinge lugs 68 pinned to a pintle 70 which is journalled in lugs 72 projecting from a bracket 74 bolted to the work head. The pintle is secured to a vane 76 in a sector-shaped cylinder 78 carried by the bracket 74. Pipes 80 and 82 conduct pressure fluid to and from the cylinder to actuate the vane and thus raise or lower the guard 64 when loading the chuck.

*Gauge and gauge advancing mechanisms. See Figs. 1, 2, 4, 5 and 6*

A lining 90 is pressed in the interior of the sleeve 18 and has a conical cam 92 at one end. A sleeve 94 is slidable in the lining and is recessed to receive a flanged cup 96 and a guide disc 98, the latter having two holes to guide sliding pins 100 and 102. One pin 102 is secured in adjusted position by a screw 103. Hinge lugs 104 project from the pin 102 to support a pivot 106 for a feeler lever 108 which has a projecting arm supporting a screw 110 carrying a diamond feeler point 112. A flexible guard 114 covers the end of the lining 90 to keep out grit. The feeler lever has a cam arm 116 for cooperation with the conical cam 92 as will appear, and another arm 118 abuts against the pin 100. The pins have enlarged portions 122 and 124 one of which is recessed for a coil spring 126 which urges the pin 100 against the arm 118. Reed springs 128 are attached to the enlarged portions 122 and 124 and are also clamped between plates 130 carrying a finger 132. A bridge piece 134 is carried by the finger and is arranged to normally connect, electrically, two spaced plates 138 which are fastened on a block of insulation 140. Lugs 142 on the plates 138 are provided with binding screws 144 for wires which can be led out through a hollow operating rod. The sleeve 94 is threaded at one end on a threaded projection 146 of a hollow operating rod 148 having supporting collars 150 and 152 slidable in the lining 90. At a certain stage towards the end of the grinding operation, the sleeve 94 is moved endwise in the lining 90, thus releasing the feeler lever arm 116 from the conical cam 92 and letting the feeler into contact with the work. As the bore of the work enlarges, the coil spring 126 causes a relative endwise movement of the pins 100 and 102 and of the reed springs 128 which produces a magnified lateral deflection of the finger 132. The bridge piece 134 initially keeps a circuit closed at the contact plates 138 but upon the work-piece reaching the desired size, the circuit is broken and the grinding operation stops as will appear.

Figure 1:
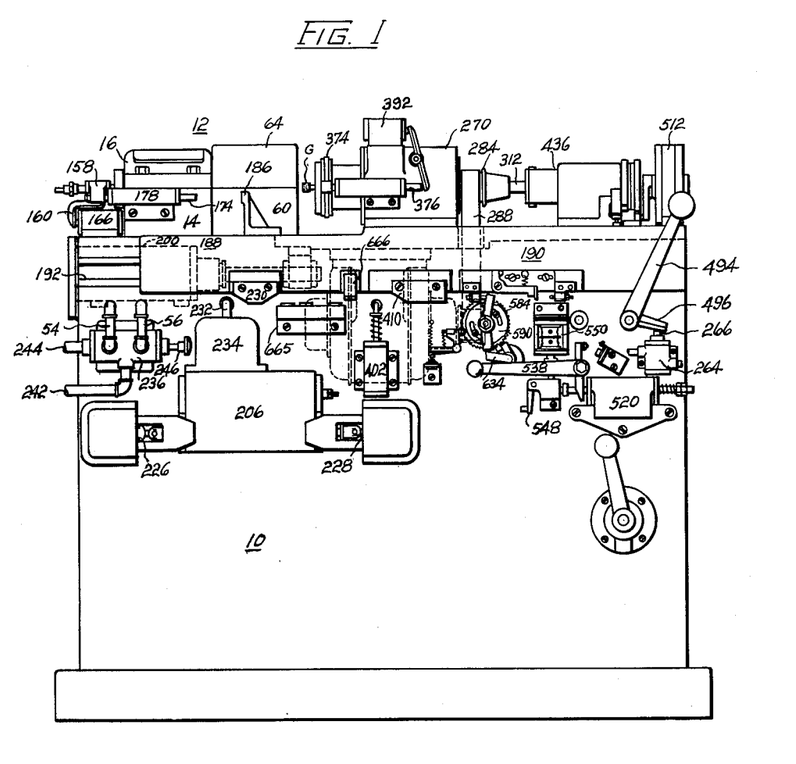
Fig. 1 is a front elevation of the machine.
Figure 2:
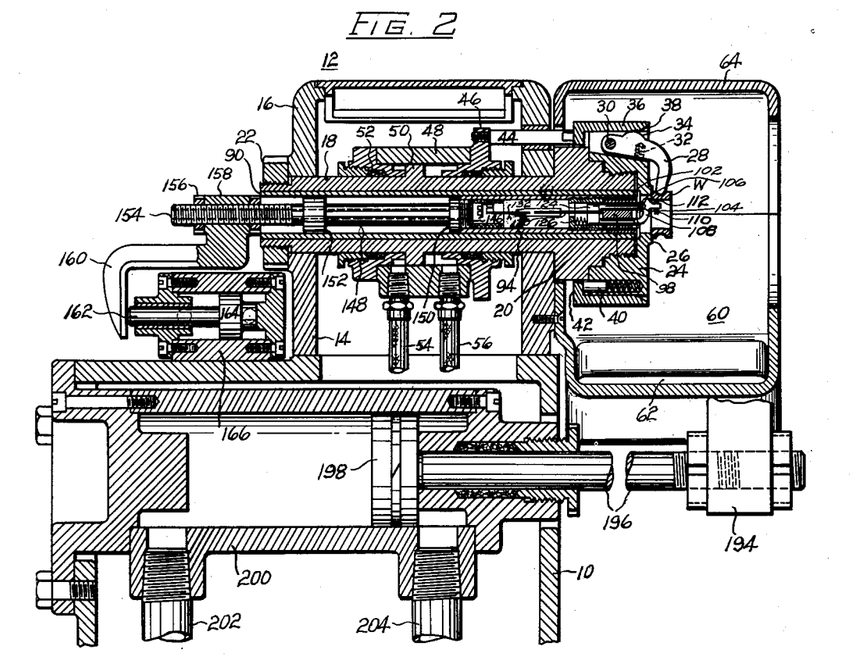
Fig. 2 is a vertical sectional view of the work head and associated parts.
Figure 3:
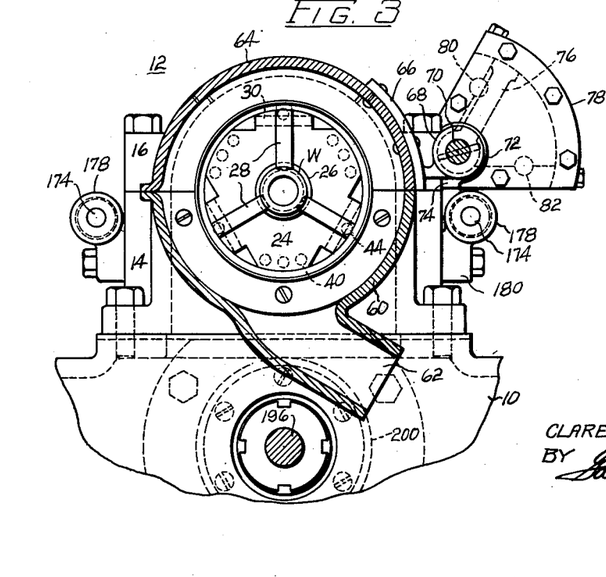
Fig. 3 is an end view of the work-head, some associated parts being in section.
Figure 4:
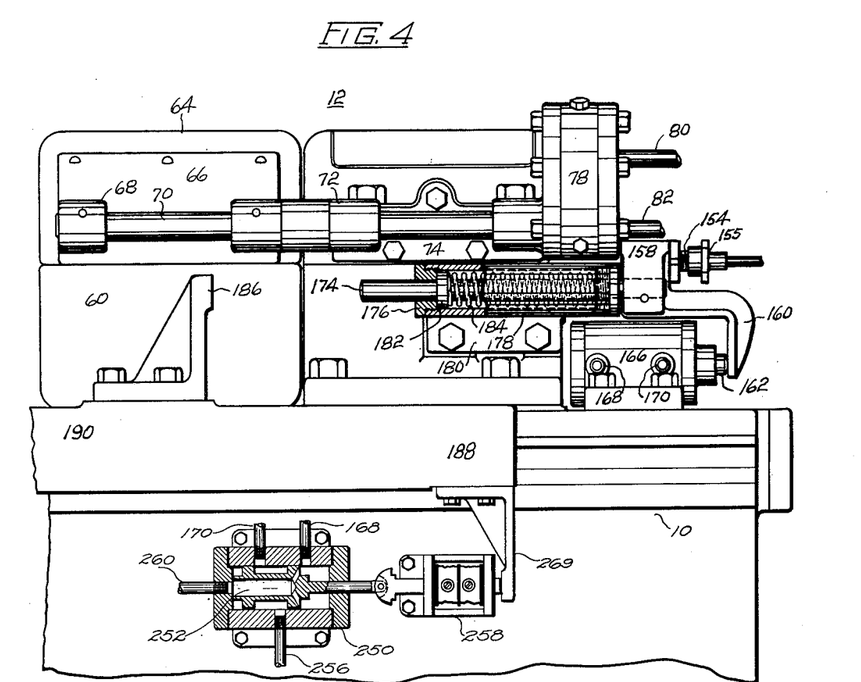
Fig. 4 is a rear elevation of the work-head, some parts being broken away and in section.
Figure 5:
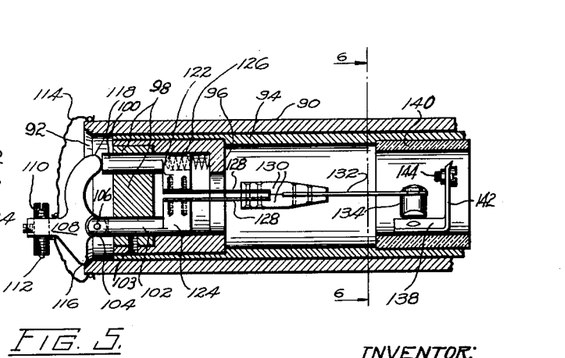
Fig. 5 is a longitudinal sectional view of a portion of the gauge mechanism.
Figure 6:
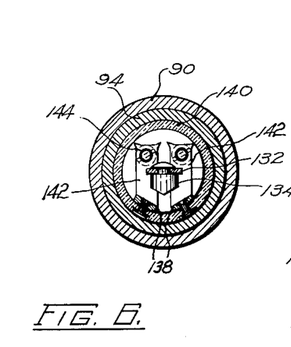
Fig. 6 is a sectional view on the line 6—6 of Fig. 5.

The rod 148 has a threaded extension 154 supporting a nipple 155, Fig. 4, carrying a flexible wiring conduit and is clamped by nuts 156 to a bracket 158. The bracket has a depending arm 160 abutting against a piston rod 162 connected to a piston 164 in a cylinder 166. Pipes 168 and 170 conduct pressure fluid to and from the cylinder to retract the gauge or to allow its advance by spring pressure as will appear. The bracket 158 is secured to a pair of slide rods 174 each sliding through a pair of threaded caps 176 attached to the ends of a guide casing 178. The two casings 178 are carried by brackets 180, one bolted to the front and one to the rear of the standard 14. Each slide rod has a collar 182 urged towards one cap of the casing by a coil spring 184, the springs moving the gauge to gauging position when the above mentioned piston rod 162 permits. After its advance to gauging position, the gauge is removed intermittently from the work to clear the advancing grinding wheel by a pair of standards 186 carried on side extensions 188 of a reciprocating table 190, the standards engaging the ends of the slide rods 174 to retract the gauge and the springs returning the gauge when the table changes direction.

*Reciprocating table and operating mechanism. See Figures 1, 2, 3, 19 and 20*

The table 190 slides on guideways 192 at the sides of the frame 10 and is connected by a bracket 194 to a piston rod 196 having an operating piston 198 in a cylinder 200 fastened to the frame under the work head. Pipes 202 and 204 alternately conduct pressure fluid to the cylinder from a reversing valve 206 of well known form. As indicated diagrammatically in Fig. 20, pressure fluid is introduced between pistons 208 from a main pressure line 210 and the pistons are shifted by a stem 212 connected to an operating piston 214 controlled by a sleeve valve 216 to which fluid is conducted from an auxiliary pressure line 218. A common exhaust line 220 has a shut-off valve 222 controlled by a handle to stop the machine manually. The valve 216 is secured to a rod 224 which is attached at its ends to the plungers of reversing solenoids 226 and 228, the solenoid 226 being the in-solenoid, that is, the one which is energized to cause the table 190 to shift inwardly towards the work. The table carries a cam 230 arranged to engage a roller on a throttle valve 232 in a casing 234 for the purpose of rendering table travel slow when the grinding wheel is being trued or dressed.

*Work-head control valve for chucking. See Fig. 20*

Figure 20:
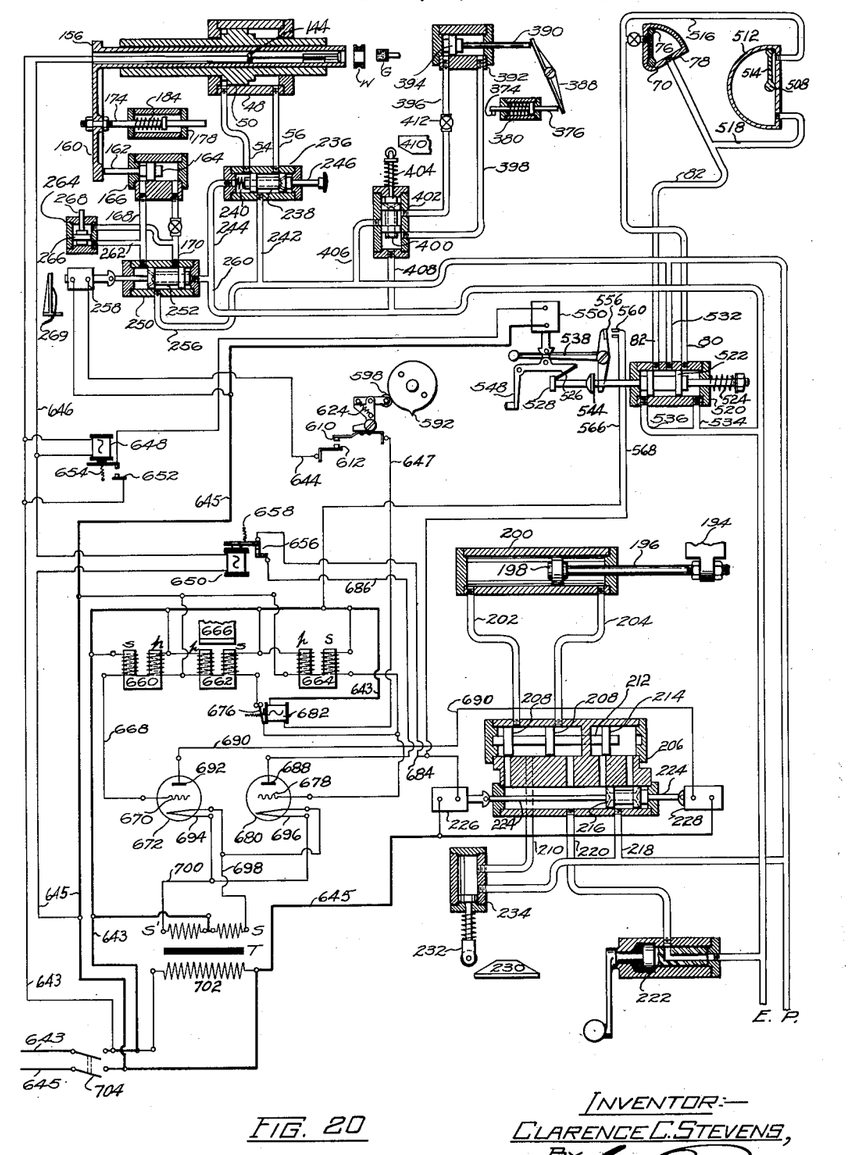
Fig. 20 is a diagram of electrical connections and fluid system.

The pipes 54 and 56 which actuated the movable work-clamping cylinder 48 are connected to a valve casing 236 containing a piston valve 238 constantly urged in one direction by a coil spring 240 whereby pressure fluid from a line 242 is directed into pipe 56 to hold the cylinder forward in clamping position, exhaust fluid from pipe 54 having connection through the valve with an exhaust line 244. A control rod 246, having a knob, projects from the valve stem for manual operation when it is desired to operate the chuck to release or secure a work-piece. In Fig. 20, the letters P and E, respectively, indicate pipes which are always in communication with pressure and exhaust lines.

*Control valve for gauge and fine feed. See Fig. 20*

A valve casing 250 contains a piston valve 252 which controls the gauge advancing piston 164. In the position indicated, pressure fluid from a line 256 is directed by the piston valve to the pipe 170 thus holding the gauge retracted. To permit the gauge to advance under pressure of the springs 184, a solenoid 258 is energized to shift the piston valve 252 outwardly to put the pipe 170 in communication with an exhaust pipe 260. At the same time, the pressure line 256 is placed in communication with a pipe 262 leading to a cylinder 264 containing a piston 266 and a plunger 268. The elevation of the plunger 268 controls a reduction in speed of a cross feeding mechanism as will later appear. The energizing of the solenoid 258 is controlled by a pawl and ratchet counting mechanism as will later appear. The valve stem 252 is not returned to initial position until the table retreats to a remote position and then a dog 269 on the rear of the table strikes the solenoid plunger, the solenoid and valve being horizontally disposed on the back of the main frame.

*Grinding wheel head and drive mechanism. See Figs. 1, 7, and 8*

Figure 7:
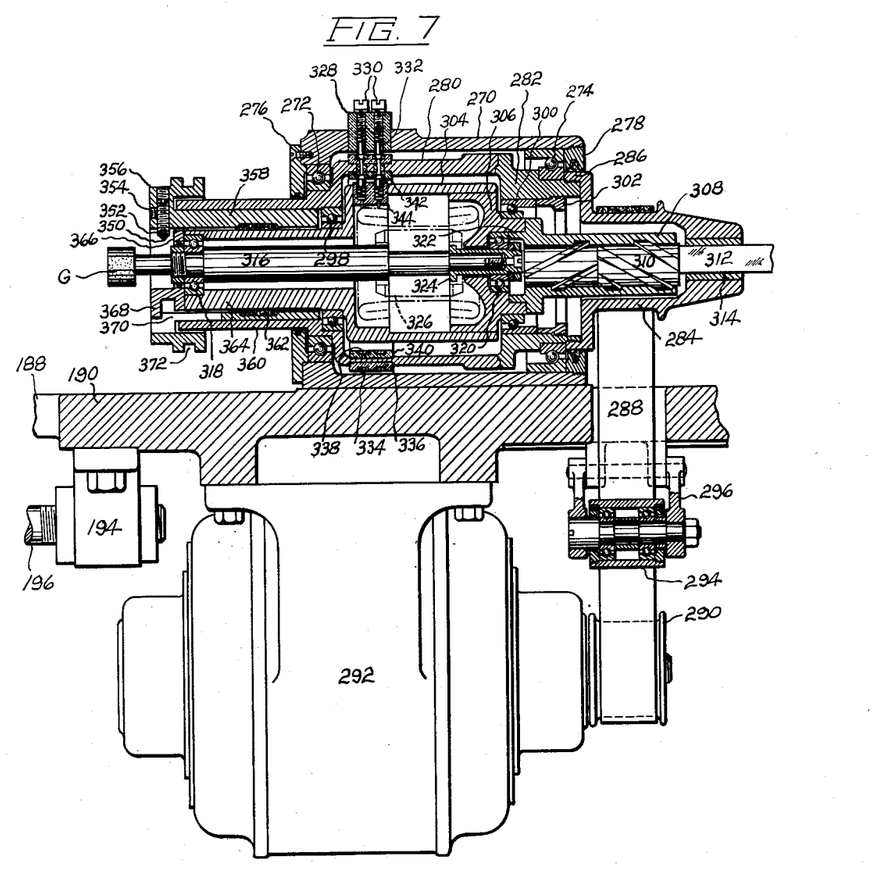
Fig. 7 is a longitudinal sectional view of the wheel head and associated parts.

Anchored to the table is a hollow frame or grinding wheel head 270 in which the outer race rings of antifriction bearings 272 and 274 are held from axial separation by a cap 276 and an adjusting nut 278, respectively. The inner race rings of the bearings are held from approach by shoulders on a rotatable housing comprising connected sections or sleeves 280 and 282. The housing is driven by a pulley 284 having a flange 286 threaded on the sleeve 282 against the adjacent inner race ring. A belt 288 running around the pulley is driven by a pulley 290 on the shaft of a motor 292 which is bolted on the bottom of the table 190. A suitable belt-tightening roller 294 is pivotally hung on the table by links 296. The housing sleeves or sections 280 and 282 have bores which are internally eccentric with respect to the outer bearings 272 and 274, and support the outer race rings of intermediate antifriction bearings 298 and 300. The outer race rings are held from axial separation by a shoulder on the sleeve or section 280 and by an adjusting nut 302 in the sleeve or section 282. The inner race rings of said bearings support, for relative rotary adjustment, an inner housing comprising connected sleeves or sections 304 and 306. The inner race rings are mounted on externally eccentric portions of the sleeves. The inner and outer housings can be locked together for simultaneous rotation as a unit on the outer bearings 272 and 274 by mechanism comprising an internally threaded sleeve 308 engaging an externally threaded enlargement 310 on a shiftable bar 312 which is square or oblong in cross section to fit and slide in a similarly shaped opening 314 in the pulley hub.

During the aforesaid simultaneous rotation of the housings, the bar 312 can be held from endwise movement with respect to the grinding wheel head if desired but it also can be slowly moved endwise as will appear to change the angular position of the inner housing and a grinding spindle which is rotatably supported thereby. The threaded enlargement 310 and the sleeve 308 are offset or eccentric with respect to the center of the pulley 284 and to the center of the outer housing but are concentric with the intermediate bearings 298 and 300. A spindle 316 carrying the grinding wheel G is journalled in the inner housing by inner antifriction bearings 318 and 320 which are eccentric with respect to the intermediate bearings 298 and 300. The outer race ring of the bearing 320 is clamped by a flange 322 on the threaded sleeve 308, and the inner race ring is adjusted by nuts on a thimble 324 which is fastened by a screw to the spindle. The thimble clamps the rotor 326 of a driving motor against a shoulder on the shaft, the field windings being enclosed in the housing 304. Since the inner housing and the outer housing have eccentric rotative adjustment which varies the distance apart of their centers, suitable compensating conducting mechanism is provided to carry the current to the motor. This mechanism comprises a block of insulation 328 mounted in an opening of the head 270 and having binding screws 330 engaging springs abutting against brushes 332 which engage collector rings 334 mounted in channels of insulating rings 336 on the outside of the outer housing 280. The rings 334 are electrically connected by insulated rivets to similar collector rings 338 mounted in channels of similar insulating rings 340 on the inside of the outer housing. Spring-pressed brushes 342 are mounted to slide in a block of insulation 344 carried by the inner housing 304 and are electrically connected to the motor windings.

In the position indicated in Fig. 7, the grinding wheel spindle 316 alone can be rotated on its axis by its motor 326 while the driving motor 292 for the inner and outer rotatable housings is shut off. If now, the motor 292 be started and if the bar 312 be held from endwise movement, the threads between the enlargement 310 and the sleeve 308 will key the inner and the outer housings 304 and 280 together for rotation as a unit in the outer bearings 272 and 274. The speed of rotation of the grinding wheel spindle on its axis will thus be increased by the speed of rotation of the housing. If now a definite amount of endwise movement be imparted to the bar 312, the reaction of the threads will cause the inner and the outer rotatable housings to have a relative rotative adjustment which, by means of the eccentric relation of the intermediate bearings to both the outer and the inner bearings, will cause the axis of the grinding wheel spindle to be shifted to an offset or eccentric position with respect to the outer bearings 272 and 274. The wheel axis will then be bodily revolved in a circular orbit while the wheel also turns on its axis. In such relation of parts, the grinding wheel will have a shifting cutting point or line which moves in a circle adapted to polish a circular bore. In the preferred method of operation, however, the eccentricity of the wheel axis with respect to the outer bearings is very gradually increased by a slow endwise movement of the bar 312 to produce a cutting or cross feed of the wheel. The path of the shifting cutting point of the wheel is then a spiral wherein the distance of the cutting point from the axis is slowly increased. The mechanism for so shifting the bar 312 will be later described. It is also to be noted that, under the above conditions, the spindle 316 need not be revolved and that any other cutting tool on such non-rotating spindle would move in a circular orbit.

Figure 8:
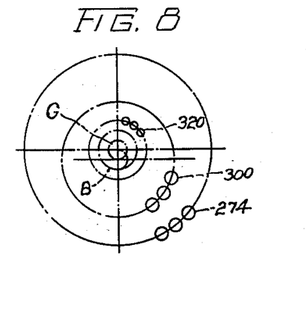
Fig. 8 is a diagrammatic view illustrating the eccentric relation of some bearings in the wheel head and the manner of adjusting the orbit of the wheel spindle.

In Fig. 8, the eccentricity of the intermediate bearings 300 with respect to the outer bearings 274 and to the spindle bearings 320 is indicated. The grinding wheel G is shown in concentric position with respect to bearings 274 and in such position would have rotation without orbital revolution. If the inner housing is gradually turned 180° with respect to the outer housing, the grinding wheel axis will shift outwardly, its maximum orbit being represented by the circle B. The feed mechanism for this shifting of the grinding wheel axis will be later described.

*Dressing mechanism. See Figs. 1, 7, 11, 12 and 20*

Dressing mechanism for the grinding wheel G is mounted on the wheel head and comprises a diamond 350 carried by a screw 352 which is adjustably clamped by a set screw 354 in a radial hole of a collar 356 carried at the end of an eccentric sleeve 358 which is slidably supported in an extension 360 of the outer rotary housing 280. The sleeve 358 has a ring of packing felt 362 or the like, bearing against an eccentric extension 364 of the inner rotatable housing 304 to keep grit from the housings. A felt-containing cap 366 clamps the outer race ring of the bearing 318 to the extension 364 and surrounds a nut which clamps the inner race ring. The relative angular positions of the eccentric sleeve 358 and the eccentric extension 364 are maintained by a lug or key 368 on the cap 366 which enters a longitudinal slot 370 in the eccentric sleeve 358. The diamond is thus compelled to travel the same orbit as the cutting line of the grinding wheel or in other words is always kept as far from the center of rotation as the most remote point of the wheel. To slide the diamond outwardly across the wheel, the collar 356 has a circumferential groove 372 into which a forked arm 374 projects from a rod 376 which is slidably mounted in guiding heads 378 on a casing 380 which is fastened by a bracket 382 to the front of the wheel head. A coil spring 384 is interposed between one of the heads 378 and a collar 386 on the rod to urge the dressing mechanism to inoperative or retracted position. A lever 388 is pivoted on the head 270 with one arm abutting against the rod and the other arm abutting against a piston rod 390 projecting from a cylinder 392. The dressing mechanism is moved to operative position by a piston 394 operated by fluid pressure entering the cylinder through a pipe 396, exhaust fluid passing out of a pipe 398. The dressing operation is controlled (Figs. 1 and 20) by a piston valve 400 in a casing 402, the piston valve being urged by a coil spring 404 to a raised position which places pipe 396 in communication with a pressure line 406 and shuts off the normal communication of the pipe with an exhaust line 408. The table 190 carries a cam 410 which keeps the stem of the valve depressed during the coarse feed grinding operation but starts the operation of the valve whenever the table retreats on an amplified stroke to remove the grinding wheel from the work. The dresser also advances when the table retreats to a remote position and the collar 356 forms a cover or guard for the wheel. The dresser can be rendered inoperative at will by means of a shut-off valve 412 which also serves as a throttle valve.

*Actuating mechanism for eccentric cross feed. See Figs. 1, 13, 14, 16 and 17*

An antifriction bearing 420 (Fig. 13) has its inner race ring clamped by nuts 422 to the end of the shiftable bar 312. The outer race ring of the bearing is held against the end of a sliding cross-head 424 by a threaded cap 426. The cross-head is held from rotation by keys 428 entering key slots 430 in the cross-head and in a supporting casing, the keys being in the form of straps whose ends are bent outwardly as at 432 and secured by a ring 434 screwed to the end of a casing 436. The casing is carried by a standard 438 fastened to the reciprocating table 190. The cross-head is an enlargement formed on a screw shaft 440 threaded in a driving sleeve 442 which is journalled for rotation without endwise movement in antifriction bearings 444 and 446 carried by the casing. The inner race rings of the bearings are held from approach by shoulders on the sleeve and the outer race rings are held from separation by a ring 448 abutting against a shoulder in the casing and by a ring nut 450 threaded in one end of the casing around a spacing washer 452. Rotation of the sleeve will obviously cause the screw-shaft to move endwise. Ratchet wheels 454 and 456 are secured on the end of the sleeve by having their hubs screw threaded internally to fit external threads on the sleeve. The teeth of the ratchet wheel 454 (Fig. 17) face in one direction for step-by-step feeding by a pawl 458, and the teeth of the other ratchet wheel 456 face in the opposite direction for a single-step return by a pawl 460.

The pawl 458 is pivoted at 462 to an oscillating lever 464 which is pivoted at 466 to a lug on the standard 438. The pawl 458 is urged towards its ratchet wheel by a coil spring 468 but towards the end of each downward swinging of the lever 464, a shoulder 470 of the lever lifts the pawl from the ratchet wheel, this lifting being for the purpose of ultimately permitting the ratchet wheels to be reversed. The lever 464 has a ball and socket connection at 472 with a plunger 474 which passes vertically through the table and has a ball and socket connection 476 with a lever 478 which is pivotally mounted at 480 on the reciprocating table 190. The lever 478 is urged downwardly by a coil spring 482 and carries a cam roller 484 which runs on a cam plate 486 having a cam 488 at one end. The variable height of the cam plate 486 determines the number of ratchet teeth pushed ahead by the pawl because a lifting of the cam plate also shifts it longitudinally to the left in Fig. 16 as will appear, and so moves the cam 488 to a less effective position with respect to the roller 484 which moves with the table. The roller rides up the cam 488 when the grinding wheel is clear of the work on its in-stroke. With the cam plate 486 at an initial low level the cam is in its most effective position with respect to the roller 484 and the pawl can be given a coarse feed stroke but the following mechanism is provided to elevate the cam plate to shift the cam to the left to a less effective position, thus to reduce the feed stroke. The cam plate is carried by a pair of parallel arms 490 whose hubs are pinned to rock shafts 492 rockably mounted in the main frame 10. Secured to one of the rock shafts outside of the frame is a weighted hand lever 494 which provides for manual actuation of the feed pawl in any position of the table. For automatic reduction of the feed stroke, another arm 496 projects from the rock shaft into abutting relation with the plunger 268 previously described so that when the gauge controlling piston valve 252 is pulled out by the solenoid 258 it directs pressure from the pipe 256 to the pipe 262, thus raising the plunger 268 and reducing the feed during the final strokes of the grinding wheel.

At the conclusion of the grinding operation, the eccentric operated cross feed mechanism of the grinding wheel is reversed by backward rotation of the ratchet wheels. The pawl 460 is pivotally hung on an arm 500 and is urged towards the ratchet wheel 456 by a spiral spring 502. A tail piece 504 on the pawl normally engages a cam 506 to hold the pawl inoperative during the operation of the feed pawl 458. The arm 500 is secured to a rock shaft 508 journalled in heads 510 of a sector-shaped cylinder 512 containing a vane 514 which is also keyed to the rock shaft. Pipes 516 and 518 conduct pressure fluid to opposite sides of the vane, these pipes being branches of the pipes 80 and 82, respectively, previously described.

Figures 9, 10:
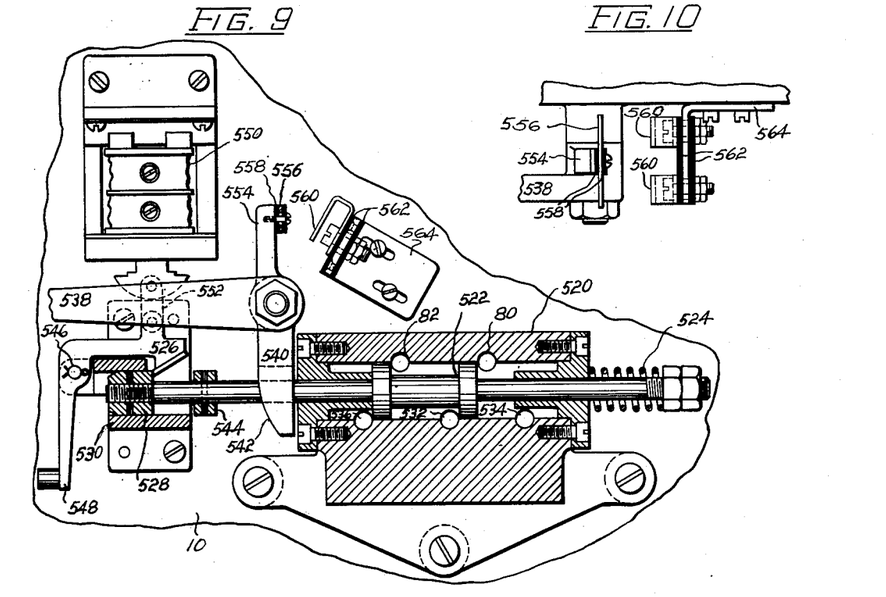
Fig. 9 is a front elevation, with some parts in section, of a control valve and associated parts.
Fig. 10 is a detail plan view of the switch of Fig. 9.
Figure 11:
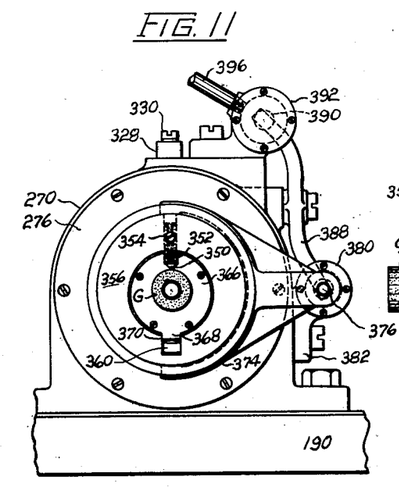
Fig. 11 is an end view of the wheel head and its associated wheel dressing mechanism.
Figure 12:
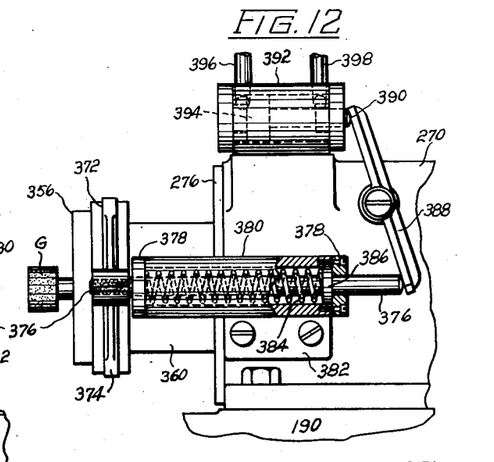
Fig. 12 is a front elevation of the mechanism of Fig. 11.
Figures 13, 14:
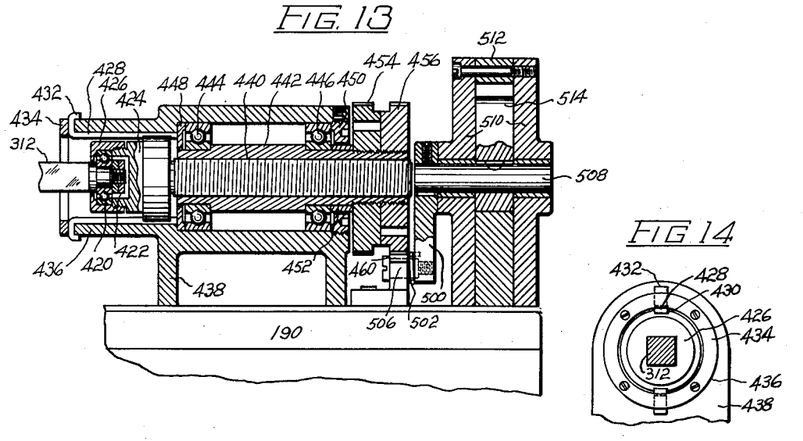
Fig. 13 is a longitudinal sectional view of a portion of the mechanism for adjusting the wheel spindle of Fig. 7.
Fig. 14 is an end view of Fig. 13 with one part in cross section.

*Control mechanism for back-off of grinding wheel and lifting of wheel guard. See Figs. 9, 10 and 20*

The pipes 80 and 82 are connected to a control valve casing 520 having a piston valve 522 urged in one direction by a coil spring 524 but normally locked in the position illustrated by a latch 526 engaging a collar 528 on the stem of the valve, the collar being guided in a casing 530. In the locked position, pressure fluid from a pipe 532 is directed through pipes 82 and 518 and against the vane 514 to hold the pawl 460 disengaged from the ratchet wheel by engagement of the tail piece 504 with the cam 506. Meanwhile pressure fluid is also directed against the vane 76 to hold down the hood or guard 64. Pipes 80 and 516 are then in communication with exhaust pipe 534. When the latch 526 releases the collar 528, the valve is shifted to the right in the figures and pressure fluid is directed from the pipe 532 into the pipes 80 and 516 while exhaust fluid from the pipes 82 and 518 is directed out through the valve to an exhaust pipe 536. Hence the vane 514 and the arm 500 are swung counterclockwise, the reversing pawl 460 moving against the ratchet wheel 456, and the ratchet wheels and their connected screw sleeve 442 are reversed to back off the grinding wheel. Meanwhile the vane 76 is actuated clockwise to lift the guard 64 to afford access to the completed work.

The piston valve 522 is moved to its latched position by a weighted hand lever 538 having a forked arm 540 straddling the valve stem and having a cam 542 arranged to engage a collar 544 and so cam the valve stem to the left. The latch 526 is pivoted at 546 and has a hand lever 548 for its manual release if desired but automatic release under control of the gauge is effected by a solenoid 550 having its plunger pivotally connected to the latch by a link 552. A starting switch is temporarily operated by an arm 554 on the hand lever 538. The arm 554 carries a contact plate 556 which is insulated from the arm by plates of insulation 558. The contact plate 556 is arranged to bridge a pair of contact terminals 560 insulated from one another by plates of insulation 562 supported by a bracket 564 fastened on the machine frame. The contact terminals 560 are connected by binding screws to wires 566 and 568 which temporarily complete a circuit to energize the in-solenoid 226 which starts the table 190 towards grinding position.

Figure 15:
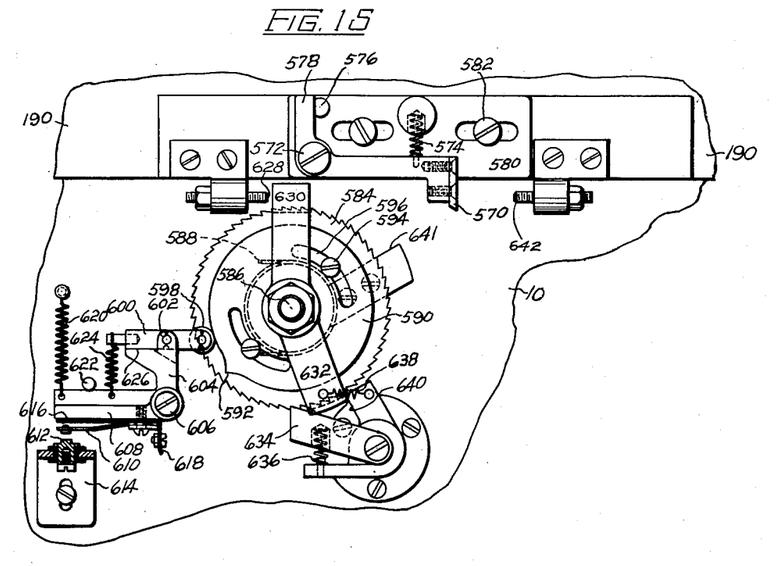
Fig. 15 is a front elevation of a counting mechanism.
Figure 16:
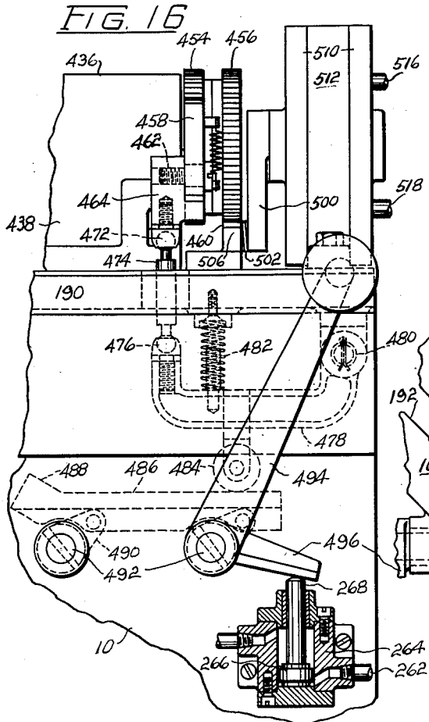
Fig. 16 is a front elevation, with some parts in section, of portions of the cross feed mechanism.
Figure 17:
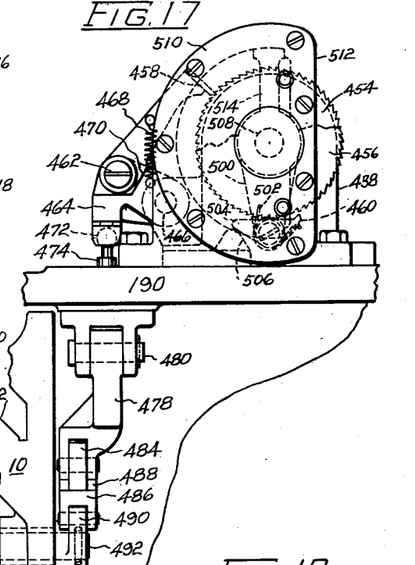
Fig. 17 is an end elevation of Fig. 16.
Figure 18:
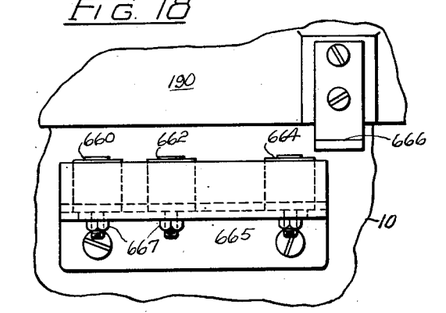
Fig. 18 is a front elevation of a portion of the induction control mechanism.
Figure 19:
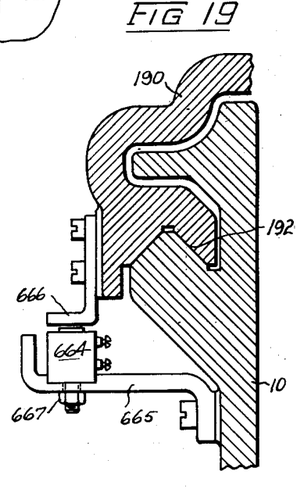
Fig. 19 is an end view of Fig. 18 with a portion of the frame and table in section.

*Counting mechanism controlling initiation of fine feed, advance of gauge and wheel truing. See Figs. 1, 15 and 20*

The gauge is preferably not advanced to operative position until the rough grinding operation has been completed and the fine feed is ready to go into operation. Such advance of the gauge is controlled by a counting ratchet mechanism actuated from the table 190 in its reciprocation. A pawl 570 is pivotally mounted on the table at 572 and is urged downwardly by a coil spring 574 as far as permitted by a stop pin 576 engaging a tail piece 578 on the pawl. All of these parts are carried by a plate 580 which is adjustably secured to the table by screws 582 passing through slots in the plate. As the table reciprocates the pawl 570 engages the teeth of a ratchet wheel 584 mounted on a shaft 586 and turns the ratchet wheel clockwise against the tension of a spiral spring 588 having one end secured to the frame 10 and the other end secured to the ratchet wheel. A disc 590, having a cam 592, is secured to the ratchet wheel by screws 594 passing through arcuate slots 596 so that the angular position of the cam 592 can be adjusted. Depending on the angular adjustment, the ratchet wheel is given a predetermined number of feed impulses by the pawl to bring the cam 592 into contact with a roller 598 on a lever 600. This action temporarily closes a switch, the lever 600 being pivoted at 602 to a bell-crank lever 604 which is pivoted at 606 on the frame and has an arm 608 carrying a contact making spring 610 arranged to engage a contact member 612. The contact member 612 is insulated from a supporting bracket 614 on the frame and has a screw to attach a wire. The contact spring 610 is insulated from the arm 608 by a plate of insulation 616 and has a bent terminal lug 618 with a binding screw. A coil spring 620 urges the arm 608 against a stop pin 622 but will yield when the bell crank lever is turned counterclockwise by the cam 592. The small lever 600 is urged by a coil spring 624 against a shoulder 626 which allows the small lever to pivot in a clockwise direction only, as when the cam and ratchet wheel snap back to their initial position under control of the spiral spring 588. This return is initiated by the retreat of the table to a remote position, a screw 628 on the table then engaging a pivoted lever 630 and causing a depending arm 632 of the lever to trip a detent pawl 634 which is urged by a coil spring 636 against the ratchet wheel. A coil spring 638 normally urges the arm 632 against an abutment 640. This abutment also serves as a bumper to stop the backward turning of the ratchet wheel which carries a stop arm 641 to engage such bumper. A dog 642 on the table, upon subsequent advance thereof, strikes the lever 630 to return the pawl 634. Thus a predetermined number of normal reciprocations of the table determine the instant of temporarily closing the switch afforded by the contact parts 610 and 612. As the cam 592 passes the roller 598, it allows the switch contact part 610 to open by the action of the coil spring 620. As indicated in the diagram, contact part 610 is connected by a wire 647 leading through a relay coil 682 to a main line wire 643, and contact part 612 is connected by a wire 644 to one terminal of the solenoid 258, the other terminal of the solenoid being connected to another line wire 645. The solenoid is thus energized to pull the valve stem 252 to control the advance of the gauge and to reduce the cross feed as above described. Another circuit is controlled by the switch 676 and relay 682 as will appear to give the table an amplified stroke to control the wheel truing operation.

The gauge controls the final grinding of the work and finally breaks the gauge circuit by moving the bridge piece 134 from the spaced contacts at 138. The main line wire 643 is directly connected to one of the contact screws 144 and a wire 646 connects the other contact screw 144 to each of two relays 648 and 650. Relay 648 holds a switch 652 open until the opening of the gauge circuit allows a coil spring 654 to close the switch. The closing of the switch 652 energizes the solenoid 550 which, as above described, releases the valve which controls the operation of the two vanes 76 and 514. Relay 650 holds a switch 656 closed until the opening of the gauge circuit allows a coil spring 658 to open the switch. The opening of the switch 656 renders the in-solenoid 226 inoperative so that the table will not again be reversed towards its in-position.

*Inductive control of table reciprocation. See Figs. 1, 18, 19 and 20*

The grinding reciprocations of the table and a single amplified reciprocating stroke to retract the grinding wheel for the dressing operation are controlled inductively by amplifying tubes and transformers. Three pairs of transformer coils 660, 662 and 664 are supported by a bracket 665 on the frame just below the path of a metal plate 666 carried by the reciprocating table. The transformers are individually adjustable in a channel of the bracket 665 and are clamped by nuts 667. The primary coils *p* of the transformers are in circuit with the main line wires 643 and 645. The secondary coil *s* of the first transformer has one terminal connected by a wire 668 to the grid 670 of an amplifying or grid-glow tube 672, the other terminal being connected to line wire 643. The other two secondaries *s* each have one terminal connected to the main line wire 643. The remaining terminal of the secondary of the coil 664 is connected to the grid 678 of a grid-glow tube 680. The remaining terminal of the secondary of the coil 662 is normally in circuit through a spring pressed relay switch 676 with the grid 678 of the grid glow tube 680. The spring pressed switch 676 can be opened temporarily by a relay 682 which has one terminal connected to the main line wire 643 and the other terminal connected to the contact part 610. The contact parts are temporarily brought together by the above described counting mechanism at the same time that the gauge is advanced and the fine feed started and the action of the relay renders the coil 662 temporarily inoperative. The solenoids 226 and 228 each have one terminal connected to the main line wire 645. The remaining terminal of solenoid 226 is connected by a wire 684 to the relay switch 656 which latter is also connected by a wire 686 to the plate 688 of tube 680. The remaining terminal of the solenoid 228 is connected by a wire 690 to the plate 692 of the grid glow tube 672. The filaments 694 and 696 have one set of their terminals connected by a common wire 698 to one terminal of a secondary S of a current transformer T. The other set of filament terminals are connected by a common wire 700 to one terminal of another secondary S' of the transformer. The two secondaries have their remaining terminals connected to the main line wire 643. The primary 702 of the transformer T is in circuit with the main line wires when a double-pole switch 704 is closed.

As the table 190 reciprocates, the metal plate 666 passes alternately over the transformers 660 and 662. When it passes either transformer, it disturbs the magnetic flux, thus causing a momentary surge in the voltage in the secondary winding which is connected to the grid of the respective tube. When the transformer 660 and the grid 670 are thus affected, as at the end of the in-stroke of the table, the plate 692 and filament 694 cause the solenoid 228 to be energized and the reversing valve is operated to carry the table out. In the outward movement, the transformer 662 and the grid 678 are affected and the solenoid 226 is energized thereby operating the reversing valve to carry the table in again. When the counting mechanism throws the contacts 610 and 612 together, the relay 682 opens the switch 676 temporarily to render the second transformer 662 inoperative. Hence the grid 678 is not affected until the outwardly moving table carries the plate 666 to the third transformer 664. The action of the solenoid 226 is thus postponed and so gives the table a longer stroke outwardly so that the grinding wheel comes out of the work and is accessible for dressing. The amplified outward movement of the table carries the table cam 410 from its valve stem 400; the dresser is accordingly advanced and of course withdrawn when the cam 410 again depresses the valve stem as the table returns. The speed of table movement is reduced temporarily by the table cam 230 and the co-operating throttle valve 232. When the work is to size and the gauge circuit is opened, the relay switch 656 opens, and the plate 688 of the tube 680 is disconnected from the in-solenoid 226 and the table runs out to a remote position without reversing.

Assuming the reciprocating table is in the remote position, the operator presses in the valve stem 246 which causes the cylinder 48 to slide to the left to open the chuck. The operator presents a work-piece to the chuck and releases the valve stem whereupon the piece is gripped. The weighted hand lever 538 is swung clockwise to move the piston control valve 522 to the left to latched position. This causes actuating of the vane 76 counterclockwise to lower the chuck guard 64, and causes actuation of the vane 514 and arm 500 clockwise to move the reverse pawl 460 against the cam 506 and away from the ratchet wheel 456. The same movement of the hand lever brings the electric contacts 556 and 560 together temporarily to energize the in-solenoid 226 so that the reversing valve is avtuated to send the table in. Upon releasing the hand lever this temporary circuit is broken. As the table moves in, the table cam 410 depresses its piston valve 400 so that the diamond carrier and wheel guard 356 are retracted. The table dog 642 strikes the lever 630 so that the detent pawl 634 swings in against the counting ratchet wheel 584. As the wheel passes through the bore of the work, the roller 484 rides up the feed cam 488 and the feed pawl 458 is actuated for the first feed stroke. If desired the operator can hasten the feed initially by rocking the hand lever 494. When the plate 666 passes over the transformer 660, the out-solenoid 228 is energized and the table moves out and continues to reciprocate. The coarse feed continues and the table pawl 570 actuates the counting ratchet wheel 584. When the counting mechanism brings together the electric contacts 610 and 612, the solenoid 258 is energized to slide the piston valve 252. This raises the plunger 268 to reduce the feed strokes of the feed pawl, and releases the gauge moving piston 164 so that the springs 184 urge the gauge mechanism to operative position, ready for repeated entry of the feeler point into the work under control of the standards 186 and rods 174. The circuit through the relay 682 is also completed by the counting mechanism to open the relay switch 676, temporarily, to render the second transformer 662 inoperative. The table thus makes an implified withdrawal stroke until the third transformer 664 reverses it and, as the table cam 410 releases the piston valve 400, the diamond dressing mechanism is advanced by its piston 394 across the grinding wheel, returning as soon as the table cam depresses the piston valve on the in-stroke of the table. The throttle valve 234 slows down the table during dressing. Grinding continues with fine feed advance until the feeler gauge breaks the gauge circuit and de-energizes the relays 648 and 650. Relay switch 652 is thus closed and the solenoid 550 is energized to release the latch 526 of the piston control valve 522. The vane 76 causes the chuck guard 64 to be raised and the vane 514 causes the reversing ratchet wheel 456 to be turned to back off the grinding wheel from the work. The relay switch 656 opens and renders the second grid glow tube 678 inoperative so that the table runs out to the end of its stroke without reversing. As the table reaches its remote position, the table dog 628 strikes the lever 630 to knock out the detent pawl 634 whereupon the counting mechanism is restored to initial position. Also the table dog 269 strikes the plunger of the solenoid 258 and the piston valve 252 is restored to initial position. This retracts the gauge, thereby completing the gauge circuit to energize the relays 648 and 650, and depresses the fine-feed controlling plunger 268 ready for repeating the cycle.

I claim:

1. In a machine of the character described, a rotatable member, a bearing therefor, means for rotatably driving the member on its bearing, a second member journalled in the first said member and having its bearing eccentric to the first bearing, a tool carried by one of the members, a bar slidably keyed to one of the members, and a threaded connection between the bar and the other member; substantially as described.

2. In a machine of the character described, a rotatable member, a bearing therefor, means for rotatably driving the member on its bearing, a second member journalled in the first said member and having its bearing eccentric to the first bearing, a tool carried by one of the members, a bar slidably keyed to one of the members, a threaded connection between the bar and the other member, and means shifting the bar during rotation of the members; substantially as described.

3. In a machine of the character described, an inner housing, a spindle journalled for rotation in the housing, a motor in the housing for driving the spindle, an outer housing, a bearing between the housings and arranged eccentric to the spindle bearing, rings carried by one of the housings, spring pressed brushes carried by the other housing, and means for causing relative rotary adjustment between the housings; substantially as described.

4. In a machine of the character described, an inner housing, a motor in the housing, an outer housing, a bearing between the housings, a casing, a bearing between the casing and the outer housing, rings carried by the outer housing, brushes carried by the inner housing and electrically connected to the motor, and brushes carried by the casing and electrically connected to a source of current; substantially as described.

5. In a machine of the character described, an inner housing, a motor in the housing, an outer housing, a bearing between the housings, a casing, a bearing between the casing and the outer housing, and means for conducting current through the housings to operate the motor and comprising a set of rings and brushes between the inner and the outer housings, and a set of rings and brushes between the outer housing and the casing; substantially as described.

6. In a machine of the character described, a grinding wheel, a wheel-head, a wheel guard movably mounted on the wheel-head to cover or uncover the grinding wheel, a wheel dressing tool carried by the guard, and means for shifting the guard to traverse the tool along the wheel; substantially as described.

7. In a machine of the character described, a grinding wheel, a wheel-head having means to carry the wheel bodily in an orbit, a dressing tool movable in an orbit, and means for shifting the dressing tool across the wheel; substantially as described.

8. In a machine of the character described, a grinding wheel, a wheel-head having means to carry the wheel bodily in an orbit, an eccentric sleeve slidably mounted on the wheel-head, a dressing tool carried by the sleeve, and means for sliding the sleeve; substantially as described.

9. In a machine of the character described, a grinding wheel, a wheel-head having means to carry the wheel bodily in an orbit and comprising a housing with an eccentric portion, an eccentric sleeve shiftable on said eccentric portion and rotatable therewith, and a dressing tool carried by the sleeve; substantially as described.

10. In a machine of the character described, a grinding wheel, a wheel-head for supporting the grinding wheel, a dressing tool movably mounted on the wheel-head, a spring-pressed member for urging the dressing tool along the wheel in one direction, a piston and cylinder unit for shifting the dressing tool along the wheel in the other direction, a valve controlling the unit, a reciprocating table, and a cam on the table for controlling the valve; substantially as described.

11. In a machine of the character described, a grinding wheel, a wheel-head, a wheel guard mounted on the head and shiftable to cover and uncover the wheel, and a piston and cylinder unit mounted on the head for controlling the shifting of the guard; substantially as described.

12. In a machine of the character described, a grinding wheel, a wheel-head, a wheel guard shiftable to cover and uncover the wheel, a wheel dressing tool carried by the guard, and a piston and cylinder unit for controlling the shifting of the guard; substantially as described.

13. In a machine of the character described, a work-head, a tool-head, a table carrying one of the heads, means for reciprocating the table, and induction mechanism for controlling the reversing action of the reciprocating means; substantially as described.

14. In a machine of the character described, a work-head, a tool-head, a table carrying one of the heads, means for reciprocating the table, induction mechanism for controlling the reversing action of the reciprocating means and comprising a pair of transformers, and a plate cooperating with the transformers alternately; substantially as described.

15. In a machine of the character described, a work-head, a tool-head, a table carrying one of the heads, means for reciprocating the table, induction mechanism for controlling the reversing action of the reciprocating means and comprising a pair of transformers, and a plate carried by and movable with the table from one transformer to the other; substantially as described.

16. In a machine of the character described, a work-head, a tool-head, a table carrying one of the heads, means for reciprocating the table, induction mechanism for controlling the reversing action of the reciprocating means and comprising a pair of transformers, a plate carried by the table and movable from one transformer to the other, and means for rendering one transformer inoperative to amplify the stroke of the table; substantially as described.

17. In a machine of the character described, a work-head, a tool-head, a table carrying one of the heads, means for reciprocating the table, induction mechanism for controlling the reversing action of the reciprocating means and comprising a pair of transformers, a plate carried by the table and movable with respect to the transformers, means for rendering one transformer inoperative, a third transformer, and means for rendering the third transformer operative when said one transformer is rendered inoperative; substantially as described.

18. In a machine of the character described, a work-head, a tool-head, a table carrying one of the heads, means for reciprocating the table, induction mechanism for controlling the reversing action of the reciprocating means and comprising a pair of transformers, a plate cooperating with the transformers alternately, and a stroke-counting mechanism operated by the table for rendering one of the transformers inoperative; substantially as described.

19. In a machine of the character described, a work-head, a tool-head, a table carrying one of the heads, means for reciprocating the table, reversing mechanism therefor comprising a pair of transformers, a pair of amplifiers, a pair of solenoids, and means carried by the table for alternately making the transformers effective; substantially as described.

20. In a machine of the character described, a reciprocating table, a frame, a plate carried by one of said parts, a plurality of transformers attached to the other of said parts, and means whereby the close association of the plate with any transformer inductively controls reversal of direction of the table; substantially as described.

21. In a machine of the character described, a work-head, a tool-head, a table carrying one of the heads, cross feed mechanism to cause relative movement of approach between work and tool and comprising a cam and a cam follower, automatic means to change the relative positions of the cam and the cam follower to change the amount of feed, and means for manually actuating one of the last members to produce a feed; substantially as described.

22. In a machine of the character described, a work-head, a tool-head, a table carrying one of the heads, cross feed mechanism to cause relative movement of approach between work and tool and comprising a cam and a cam follower, means for reciprocating the table, and a cylinder and piston unit to change the location of the cam; substantially as described.

23. In a machine of the character described, a work-head, a tool-head, a table carrying one of the heads, means for reciprocating the table, cross feed mechanism to cause a relative movement of approach between work and tool and comprising a cam and a cam engaging member, one of the last named members being carried by the table to travel along the other member for actuation, and means for shifting one such member independently of table travel; substantially as described.

24. In a machine of the character described, a work-head, a tool-head, a table carrying one of the heads, cross feed mechanism to cause relative movement of approach between work and tool and comprising a shiftable cam, a cam roller carried by the table, means for reciprocating the table to move the cam roller along the cam, and manually operated means to oscillate the cam; substantially as described.

25. In a machine of the character described, a reciprocating table, cross feed mechanism carried by the table, a cam roller having connection to the mechanism, a frame, a cam plate, and arms pivotally connecting the cam plate to the frame, the cam plate having a cam for operative action with the roller due to normal reciprocation of the table; substantially as described.

26. In a machine of the character described, a reciprocating table, cross feed mechanism carried by the table; a cam roller having connection to the mechanism, a frame, a cam plate, arms pivotally connecting the cam plate to the frame, the cam plate having a cam for operative action on the roller as the table reciprocates, and means for rocking the arms to shift the cam plate from one operative position to another to change the effect of the cam during the reciprocation of the table; substantially as described.

27. In a machine of the character described, a reciprocating table, cross feed mechanism carried by the table, a cam roller having connection to the mechanism, a frame, a cam plate having a cam for operative action on the roller due to reciprocation of the table, arms pivotally connecting the cam plate to the frame, a lever for manually oscillating the cam plate, and automatic mechanism for moving the cam plate to change the location of the cam with respect to the roller; substantially as described.

28. In a machine of the character described, a reciprocating table, cross feed mechanism carried by the table, a cam and a cam engaging member, one of the last named members being carried by the reciprocating table to travel along the other member for actuation of the cross feed mechanism, and mechanism for changing the relative positions of said engaging members to vary the amplitude of said actuation; substantially as described.

29. In a machine of the character described a frame, a reciprocating table, cross feed mechanism carried by the table, a cam and a cam engaging member, one of the last named members having connection with the cross feeding mechanism and the other member being carried by the frame in a position to actuate the first member as the table reciprocates, and means for shifting the frame-carried member to change the effect of the cam; substantially as described.

30. In a machine of the character described, a frame, a table reciprocating on the frame, a work-head on one of said members and a grinding wheel and its head on the other member, means for amplifying the stroke of the table, means for decreasing the speed of the table during the amplified stroke, a wheel dressing tool mounted on the wheel head to traverse the operative face of the wheel, and means for causing the dressing tool to travel across the wheel during the amplified stroke; substantially as described.

31. In a machine of the character described, a frame, a table reciprocating on the frame, a work-head on one of said members and a grinding wheel and its head on the other member, means for amplifying the stroke of the table to separate the work and the wheel, a wheel dressing tool, and means for causing the tool to travel along the operative face of the wheel during such separation; substantially as described.

32. In a machine of the character described, a frame, a table reciprocating on the frame, a work-head on one of said members and a grinding wheel and its head on the other member, means for amplifying the stroke of the table to separate the work and the wheel, a wheel dressing tool, means for causing the tool to travel along the operative face of the wheel during such separation, and mechanism to slow down both the movement of separation and the movement of the tool along the wheel; substantially as described.

33. In a machine of the character described, a frame, a table reciprocating on the frame, a work-head on one of said members and a grinding wheel head on the other member, means for amplifying the stroke of the table to cause separation of the wheel and the work, a guard slidably mounted on the wheel head, and means for sliding the guard over the wheel during such movement of separation; substantially as described.

34. In a machine of the character described, a frame, a table reciprocating on the frame, a work-head on one of said members and a grinding wheel head on the other member, means for causing the table to retreat to cause separation of the wheel and the work, a wheel guard, a work guard, and means for moving the wheel guard to operative position over the wheel and for moving the work guard away from the work during such movement of retreat; substantially as described.

35. In a machine of the character described, a work-head, a tool-head, a table carrying one of said heads, the other head being secured directly to the top of the frame, the table having side walls embracing the frame, the side walls being extended at the sides of the other head, and ways formed upon the side walls, their extensions, and the frame for slidably supporting the table, the ways extending throughout the length of the frame, and said side walls engaging the greater portion of the ways on the frame; substantially as described.

36. In a machine of the character described, a frame, a table reciprocating on the frame, a work-head on one of said members and a tool-head upon the other, a control valve having a latch, table reversing mechanism, a lever for moving the valve to latched position, and a starting switch operated by the lever for initiating the action of the table reversing mechanism; substantially as described.

37. In a machine of the character described, a frame, a table reciprocating on the frame, a work-head on one of said members and a tool-head upon the other, a control valve, means for moving the valve, a movable work guard on the work-head, and a fluid pressure operated unit on the work-head and having connection with the work guard, said unit being controlled by the valve for moving the work guard; independently of the movement of the table; substantially as described.

38. In a machine of the character described, a work-head comprising a support, a sleeve mounted on the support, means for securing a hollow work-piece near one end of the sleeve, a gauge carrier shiftable in the sleeve, a work-engaging feeler movably mounted on the carrier, and coacting means between the sleeve and the feeler to move the feeler with respect to the carrier upon shifting of the carrier; substantially as described.

39. In a machine of the character described, a work-head, a gauge carrier shiftable in the head, a lever pivoted on the carrier and having a work-engaging feeler, size controlling means operated by the lever, a cam, and means for shifting the carrier to cause engagement of the lever with the cam; substantially as described.

40. In a machine of the character described, a sleeve having a cam surface, a gauge carrier shiftable in the sleeve, a lever pivoted on the carrier and having a work-engaging feeler, size controlling means operated by the lever, and means for shifting the carrier to move the lever to or from the cam; substantially as described.

41. In a machine of the character described, a hollow work-head, a gauge carrier in the work-head, a lever pivoted on the carrier and having a work engaging feeler and a lever arm, size controlling means operated by the lever arm, and means for shifting the gauge carrier in the work-head to move the feeler into or out of operative relation to a work-piece on the work-head; substantially as described.

42. In a machine of the character described, a work-head, a tool-head, a reciprocating table carrying one of the heads, a gauge shiftable into operative relation to a work-piece on the work-head, means for shifting the gauge, a ratchet device, a pawl secured to the table for actuating the ratchet device, and means carried by the ratchet device for controlling the shifting of the gauge; substantially as described.

43. In a machine of the character described, a work-head, a tool-head, a reciprocating table carrying one of the heads, a pawl on the table, a ratchet wheel on the frame and positioned in the path of the table pawl for turning action thereby, and means carried by the ratchet wheel for controlling an amplified stroke of the table after a predetermined number of normal reciprocations; substantially as described.

44. In a machine of the character described, a work-head, a wheel-head, a table carrying one of the heads, means for reciprocating the table, means operated by the table for causing an amplified stroke thereof after a predetermined number of normal reciprocations, a wheel dressing tool, and means operated by the table in its amplified stroke for causing a traversing movement of the dressing tool along the operative face of the wheel; substantially as described.

45. In a machine of the character described, a work-head, a tool-head, a table carrying one of the heads, means for reciprocating the table, a frame, a ratchet wheel journalled on the frame, a pawl carried by the table in a position to engage and advance the ratchet wheel during normal working reciprocation of the table, a cam carried by the ratchet wheel, and a machine control member operated by the cam for controlling an amplified reciprocation of the table; substantially as described.

46. In a machine of the character described, a work-head, a tool-head, a table carrying one of the heads, means for reciprocating the table, a frame, a cam journalled on the frame, means for causing the movement of the table to turn the cam, a movable switch-carrying member, and a lever in the path of the cam and having a one-way swinging engagement with the member; substantially as described.

CLARENCE C. STEVENS.